L. PENTEK.
ANTISKIDDING DEVICE FOR CUSHIONED TIRE WHEELS.
APPLICATION FILED JUNE 10, 1914.
1,120,527.
Patented Dec. 8, 1914.
2 SHEETS—SHEET 1.
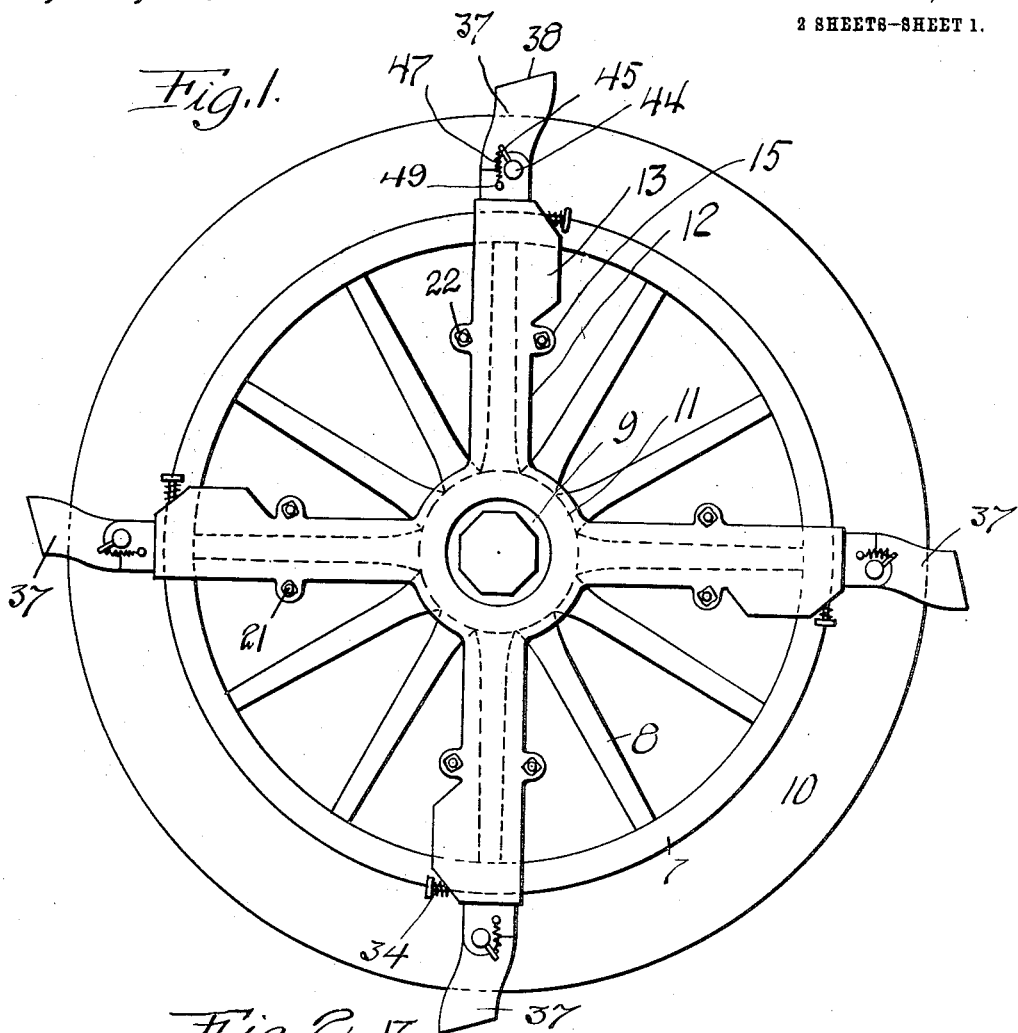
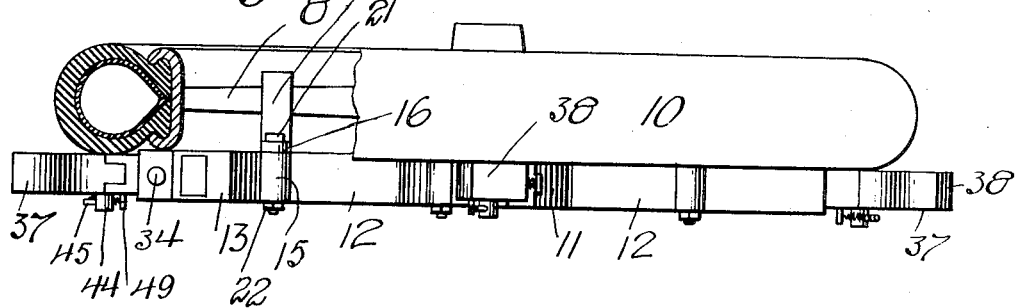
WITNESSES:
INVENTOR
L. Péntek.
BY
ATTORNEY L. PENTEK.
ANTISKIDDING DEVICE FOR CUSHIONED TIRE WHEELS.
APPLICATION FILED JUNE 10, 1914.
1,120,527.
Patented Dec. 8, 1914.
2 SHEETS—SHEET 2.
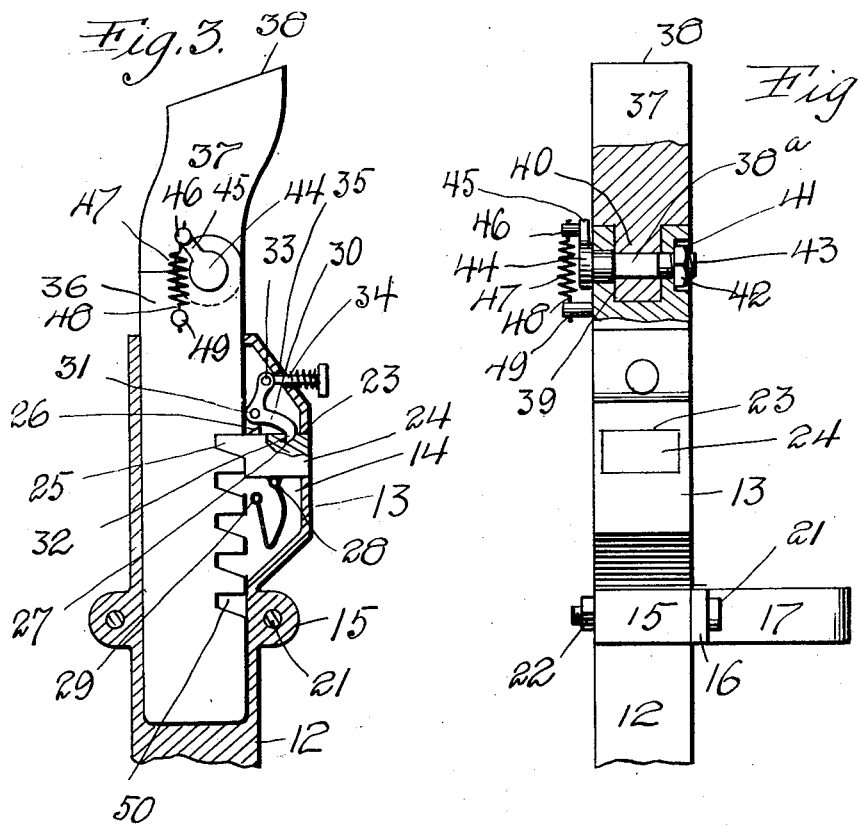
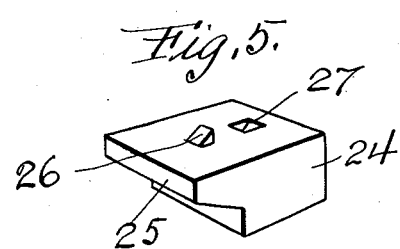
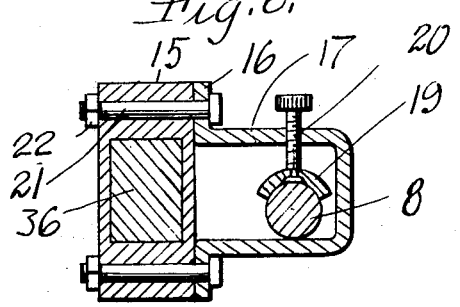
WITNESSES:
INVENTOR
L. Pentek.
BY
Henry C. Ewert
ATTORNEY

UNITED STATES PATENT OFFICE.

LÁSZLÓ PÉNTEK, OF COLUMBUS, OHIO.

ANTISKIDDING DEVICE FOR CUSHIONED-TIRE WHEELS.

1,120,527. Specification of Letters Patent. Patented Dec. 8, 1914.

Application filed June 10, 1914. Serial No. 844,261.

*To all whom it may concern:*

Be it known that I, LÁSZLÓ PÉNTEK, a subject of the King of Hungary, residing at Columbus, in the county of Franklin and State of Ohio, have invented certain new and useful Improvements in Antiskidding Devices for Cushioned-Tire Wheels, of which the following is a specification, reference being had therein to the accompanying drawing.

This invention relates to anti-skidding devices for cushioned tire wheels, and has for its object to provide a device of such class, in a manner as hereinafter set forth, which is capable of being attached to one side of the wheel and includes a plurality of anti-skidding members projecting beyond the tread of the tire of the wheel and capable of entering the surface over which the wheel is traveling to prevent skidding of the wheel.

A further object of the invention is to provide an anti-skidding device for cushioned tire wheels including a plurality of adjustable anti-skidding members capable of extending beyond the tread of the tire of the wheel when in use and further capable of being folded backwardly to a position inwardly with respect to the tread of the wheel when the members are not desired for use.

A further object of the invention is to provide an anti-skidding device, which is comparatively simple in its construction, readily attached to one side of the wheel with which it associates, strong, durable, adjustable and inexpensive.

With the foregoing and other objects in view the invention consists of the novel construction, combination and arrangement of parts as hereinafter more specifically described and illustrated in the accompanying drawings, wherein is shown an embodiment of the invention, but it is to be understood that changes, variations and modifications can be resorted to which come within the scope of the claims hereunto appended.

In the drawings wherein like reference characters denote corresponding parts throughout the several views:—Figure 1 is a side elevation of the cushioned tire wheel showing the adaptation therewith of an anti-skidding device in accordance with this invention, Fig. 2 is a top plan, partly in section of a wheel, showing the anti-skidding device connected thereto, Fig. 3 is a sectional side elevation illustrating one of the anti-skidding members, Fig. 4 is an end elevation partly in section of one of the anti-skidding sections, Fig. 5 is a perspective view of the lock for an anti-skidding member, and Fig. 6 is a sectional plan.

Referring to the drawings in detail, 7 denotes the rim, 8 the spokes, 9 the hub and 10 the tire of a cushioned wheel and to one side of the latter is adapted to be clamped the anti-skidding device in accordance with this invention.

The anti-skidding device consists of an annulus 11, which is positioned against one end of the hub 9, and is provided with a series of radially disposed casings 12, each of which is offset as at 13 near its outer end to provide a chamber 14. Each of the casings 12, inwardly with respect to an offset portion 13 is provided with a pair of oppositely extending lateral apertured lugs 15, against which is positioned the flanges 16 of right angularly disposed yokes 17, and these latter are adapted to surround a plurality of spokes 8. Mounted in each of the yokes 17, is a clamping member 19, carried by a clamping screw 20, which adjustably engages with one arm of a yoke 17. The screw 20 in connection with the clamping member 19 clamps the yoke 17 to those spokes which said yokes surround, and as the flanges 16 are secured to the apertured lugs 15, through the medium of the bolts 21 and nuts 22, it is obvious that the casings 12 are clamped to the spokes 8 at one side of the wheel. The length of each of the casings 12 is such as to project beyond the rim 7 and each of the offset portions 13 of said casings 12 is provided with an opening 23, through which slides a locking member 24, the latter including a nose 25 for a purpose to be presently referred to.

Each of the locking members 24 has its top provided with a lug 26 and a recess 27, and connected to the bottom of each of said members 24, is one end of a spring 28, the other end being fixed as at 29. The function of the spring 28 is to project the member 24 outwardly through the opening 23. To arrest outward movement of said member 24, a spring controlled latching device is employed, and which consisted of a latch member 30, in the form of a bell crank lever, and which is pivotally connected as at 31 to the offset portion 13 of the casing 12. The lower arm of the bell crank lever 30 is provided with a nose 32, which engages in the recess 26 and arrests outward movement of the member 24. The end of the upper arm of the bell crank lever is pivotally connected as at 33, to a spring controlled push button 34, which extends through the opening 35 in the offset portion 13, and projects laterally from the said offset portion 13. By shifting the bar 34 inwardly, the nose 32 is moved out of the recess 26, and the member 24 can then be projected outwardly through the medium of the spring 28.

Arranged within each of the casings 12, as well as projecting therefrom is an anti-skidding member formed of an inner section 36 and an outer section 37, the latter having a beveled free terminus as at 38. The section 36 is pivotally connected to the section 37 as at 39, the pivot being disposed eccentrically with respect to the longitudinal center of the said sections 36 and 37. The section 36 is bifurcated as at 39, and the section 37 provided with a tongue 40, which extends in the bifurcated end 39 of the section 36 and is mounted upon the pivot 38ª. The opening through the tongue 40 is squared and that portion of the pivot seated in the opening of said tongue is also squared. The remaining portion of the pivot 38ª, that is that portion seated in the section 36 is cylindrical, and the section 36 has a countersink 41 for receiving a nut 42, which is carried on the threaded end 43 of the pivot 38ª. The other end of the pivot 38ª is provided with a head 44, and which is arranged exteriorly of the section 36, and said head 44 has a lug 45, projecting therefrom and carried by the lug 45 is a pin 46, through which is connected one end of a spring 47, the latter having its other end secured as at 48 to a lateral pin 49 projecting from the section 36. Each of the sections 36 of the anti-skidding members has one edge formed with teeth 50, for the reception of the noses 25 of the members 24 and when a nose 25 of a member 24 engages the teeth 50, the anti-skidding member is prevented from shifting longitudinally with respect to a casing 12. By pivotally connecting sections 36 and 37 in the manner as stated, the section 37, can be folded inwardly and be maintained in such position through the action of the spring 47 and will remain in such position until the section 37 is shifted manually to the position shown in Fig. 3.

The walls of the casing 12 snugly engage the sections 36, thereby preventing any looseness of the anti-skidding members. The locking members 24 not only arrest outward movement of the anti-skidding members when said locking members 24 are in engagement with said anti-skidding members, but also prevent said anti-skidding members from shifting inwardly after they have been adjusted to the desired position.

What I claim is:—

1. An anti-skidding device providing an annulus having a plurality of radially disposed casings, means for clamping said casings to the spoke of a wheel, adjustable anti-skidding members mounted in and projecting from said casings, means for locking said members in their adjusted position, each of said anti-skidding members including an inner and an outer section, and means for pivotally connecting the sections of each member together and further provided for maintaining the outer sections of said members in an inoperative position.

2. An anti-skidding device comprising a plurality of radially disposed casings connected together at their inner termini, means for clamping said casings to the spokes of a wheel, adjustable anti-skidding members mounted in and projecting from said casings and each provided with a row of teeth, and means carried within said casing and capable of engaging said teeth for maintaining said members in adjusted position.

3. An anti-skidding device comprising a plurality of radially disposed casings connected together at their inner termini, means for clamping said casings to the spokes of a wheel, adjustable anti-skidding members mounted in and projecting from said casings and each provided with a row of teeth, means carried within said casing and capable of engaging said teeth for maintaining said members in adjusted position, each of said members formed of an inner and an outer section, and means for pivotally connecting the said sections together and further providing for the maintaining of the outer sections in an inoperative position.

4. An anti-skidding device comprising a casing adapted to be clamped to the spokes of a wheel, an adjustable anti-skidding member mounted therein and projecting therefrom, means mounted in said casing and engaging in said member for maintaining it in its adjusted position, said member formed of two sections, and means for pivotally connecting said sections together and further providing for the retaining of the outer section in an inoperative position.

In testimony whereof I affix my signature in the presence of two witnesses.

LÁSZLÓ PÉNTEK.

Witnesses:
LÁSZLO LUKI,
FRANK TARABA.